(12) United States Patent
Fisk et al.

(10) Patent No.: US 9,145,256 B2
(45) Date of Patent: Sep. 29, 2015

(54) PREPARATION OF BEVERAGES AND LIQUID FOOD PRODUCTS

(75) Inventors: Ian Denis Fisk, Loughborough (GB); Ayse Tulay Massey, Banbury (GB); Nick Andrew Hansen, Banbury (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 0 days.

(21) Appl. No.: 13/700,995

(22) PCT Filed: May 26, 2011

(86) PCT No.: PCT/US2011/038141
§ 371 (c)(1),
(2), (4) Date: Mar. 8, 2013

(87) PCT Pub. No.: WO2011/153065
PCT Pub. Date: Dec. 8, 2011

(65) Prior Publication Data
US 2013/0156898 A1    Jun. 20, 2013

(30) Foreign Application Priority Data
Jun. 1, 2010   (GB) .................................. 1009177.5

(51) Int. Cl.
*B65D 85/804*   (2006.01)
*A23G 1/56*   (2006.01)
*A47J 31/36*   (2006.01)

(52) U.S. Cl.
CPC ............. *B65D 85/8043* (2013.01); *A23G 1/56* (2013.01); *A47J 31/36* (2013.01)

(58) Field of Classification Search
CPC ... B65D 85/8043; A47G 21/18; A47G 21/183
See application file for complete search history.

(56) References Cited

U.S. PATENT DOCUMENTS

| | | | | |
|---|---|---|---|---|
| 1,996,203 A | * | 4/1935 | Hollingsworth | 426/85 |
| 3,615,959 A | * | 10/1971 | Nance | 141/7 |
| 4,921,713 A | * | 5/1990 | Fowler | 426/85 |

(Continued)

FOREIGN PATENT DOCUMENTS

| | | | | |
|---|---|---|---|---|
| EP | 1 398 279 | * | 6/2003 | ........... B65D 85/804 |
| EP | 1440903 A1 | | 7/2004 | |

(Continued)

OTHER PUBLICATIONS

International search report mailed Jul. 26, 2011, for International Application No. PCT/US2011/038141.

(Continued)

*Primary Examiner* — Rena L Dye
*Assistant Examiner* — Chaim Smith
(74) *Attorney, Agent, or Firm* — Fitch, Even, Tabin & Flannery LLP

(57) ABSTRACT

The present invention relates to improvements in the preparation of beverages and, in particular, to an improved cartridge for preparing beverages in brewing machines. The cartridges can also be used for preparing liquid food products. The cartridge comprises a continuous elongate tubular chamber containing the at least one ingredient providing a fluid flow path linking an inlet for the introduction of the liquid at one end of the chamber to an outlet for discharge of the beverage or food product at an opposite end of the chamber. The chamber has an internal width to length ratio in the range of 1:4 to 1:200.

16 Claims, 6 Drawing Sheets

(56) References Cited

U.S. PATENT DOCUMENTS

| | | | |
|---|---|---|---|
| 4,981,468 A * | 1/1991 | Benefiel et al. | 604/83 |
| 5,094,861 A * | 3/1992 | D'Auguste et al. | 426/85 |
| 5,901,635 A | 5/1999 | Lucas et al. | |
| 2004/0177765 A1* | 9/2004 | Halliday | 99/295 |
| 2005/0112241 A1 | 5/2005 | Catani et al. | |
| 2007/0157822 A1 | 7/2007 | Fusco | |
| 2009/0095164 A1 | 4/2009 | Celeste | |
| 2009/0317518 A1 | 12/2009 | York et al. | |
| 2010/0196545 A1 | 8/2010 | Buffet et al. | |

FOREIGN PATENT DOCUMENTS

| | | | |
|---|---|---|---|
| EP | 1785369 A1 | 5/2007 | |
| GB | 2408919 A | 6/2005 | |
| JP | 2005536271 A | 12/2005 | |
| JP | 2007535332 A | 12/2007 | |
| NL | 2000247 C2 | 3/2008 | |
| WO | 93/15641 A1 | 8/1993 | |
| WO | 02074661 A1 | 9/2002 | |
| WO | 2005056423 A1 | 6/2005 | |
| WO | 2006043096 A1 | 4/2006 | |
| WO | 2008107645 A2 | 9/2008 | |

OTHER PUBLICATIONS

State Intellectual Property Office of China, First Office Action dated May 23, 2014, from corresponding Chinese Patent App. No. 20118038069, 12 pages.

Japanese Patent Office, Official Notice of Rejection mailed Mar. 24, 2015 from corresponding Japanese Patent Application No. 2013-513241, 2 pages.

State Intellectual Property Office, P.R. China, Second Office Action dated Apr. 3, 2015, from corresponding Chinese Patent Application No. 201180038069.8, 13 pages.

English translation of the Office Action mailed Mar. 13, 2015 from related Russian Patent Application No. 2012153920, 2 pages.

* cited by examiner

PREPARATION OF BEVERAGES AND LIQUID FOOD PRODUCTS

CROSS REFERENCE TO RELATED APPLICATIONS

This application is a U.S. national phase application of International Application No. PCT/US2011/038141, filed May 26, 2011, designating the United States, which claims benefit from United Kingdom Application No. 1009177.5, filed Jun. 1, 2010, both which are hereby incorporated herein by reference in their entirety.

FIELD

The present invention relates to improvements in the preparation of beverages and, in particular, to an improved cartridge for preparing beverages in brewing machines. The cartridges can also be used for preparing liquid food products.

BACKGROUND

Automated brewing machines and other on-demand beverage systems, for brewing beverages such as coffee and tea, usually have a brewing water reservoir in which water is heated by a heating element. The heated water is then transferred from the reservoir to a brewing chamber which holds brewing ingredients such as coffee grounds or tea leaves, through which the heated water flows to produce a brewed beverage. The beverage flows into a container such as a jug or cup located beneath the brewing chamber outlet.

It is commonly known that different flow rates lead to variation of characteristics in the brewed beverage, in particular taste. U.S. Pat. No. 5,901,635 explains that a relatively fast rate of flow of hot water through coffee grounds in the brewing chamber will result in relatively dilute coffee with relatively less flavour and caffeine, than is produced by a slower rate of flow. A relatively slow rate should therefore be used in order to achieve a taste comparable to "regular" or caffeinated coffee which is brewed with a relatively faster rate of flow. The flow rate can be determined by a number of variables, such as the rate at which water is introduced to the reservoir, the size of the conduit or passage between the reservoir and the brewing chamber, and the size of holes in a water distributor or showerhead over the brewing chamber. U.S. Pat. No. 5,901,635 uses an adjustable valve between the filling chamber and the reservoir to adjust the rate of flow of water from the filling chamber to the reservoir.

Many modern domestic beverage machines dispense individual servings of a beverage directly into a drinking receptacle, and derive the beverage from a bulk supply of beverage ingredients or from individual packages of beverage ingredients such as pods, pads or cartridges. In the following specification such packages will be referenced by the general term cartridges. Machines which use such cartridges reduce the need for cleaning and can enable the user to make a selection of beverages such as coffee, tea, hot chocolate and the like. An example of one type of such cartridge is described in EP-A-1440903. The beverages are formed from brewing, mixing, dissolving or suspending the beverage ingredients in water. For example, for coffee beverages, heated water is forced through the cartridges under pressure to extract the aromatic constituents from the compacted coffee grounds contained therein. The use of cartridges in such machines has become increasingly popular due to their convenience and the quality of the beverage produced.

EP-A-1440903 describes a cartridge which is formed from high density polyethylene, polypropylene, polystyrene, polyester, or a laminate of two or more of these materials. The cartridge has an inlet for the introduction of water into the cartridge, and an outlet for a beverage produced from said the beverage ingredients. The cartridge comprises an outer member, an inner member inserted in the outer member and an aperture in a beverage flow path linking the inlet to the outlet for producing a jet of the beverage. The aperture is delimited by an interface between the inner member and the outer member. The cartridge produces a jet of the beverage which can be used to alter the appearance and characteristics of the dispensed beverage, by for example entraining air into the jet of beverage to produce a multitude of small air bubbles in the dispensed beverage.

The afore-mentioned cartridges are designed to be easily assembled with the main components being the inner member and the outer member. By using separate components for the inner and outer members, which are then preferably conjoined on assembly, the manufacture of each component and the assembly of the cartridge can be optimised. This is particularly advantageous where very small tolerances are required for the size and location of the aperture that produces the jet of beverage and also for the remainder of the beverage flow path through the cartridge. However such cartridges utilise a single compaction bed with no means to vary the brew kinetics which can affect the brew efficiency and the flavour, aroma and taste quality of the final product.

WO-02/074661 describes a device for preparing customisable brewed beverages and proposes the use of two ingredient extraction chambers each containing a different volume of ingredients, such as roast and ground coffee. The strength of the finished brewed beverage can be modified by directing the brewing fluid through one or other of the chambers, or dividing the flow to go through each chamber. In another embodiment described in this prior art document, different ingredients are provided in different chambers.

However the use of flow control and diversion valves for the control of the brewing characteristics used in the prior art systems mentioned above adds to the cost and bulk of the machine. The additional moving parts add to the potential for malfunction.

EP-A-1785369 describes a beverage ingredient capsule which is sub-divided into at least two compartments, each containing one or more beverage ingredients. The compartments are constructed such that, when liquid is introduced into the capsule the separate compartments release the contained ingredients at different times so that different beverage components can be produced according to a planned time sequence. One way of achieving this is to separate the compartments with a candy wall, which dissolves when exposed to the liquid.

SUMMARY

The invention therefore provides a cartridge for use in a machine for preparing a beverage or food product from at least one ingredient and a liquid, said cartridge comprising a continuous elongate tubular chamber containing the at least one ingredient providing a fluid flow path linking an inlet for the introduction of the liquid at one end of the chamber to an outlet for discharge of the beverage or food product at an opposite end of the chamber, wherein the chamber has an internal width to length ratio in the range of 1:4 to 1:200.

The liquid flow path in the cartridge of the present invention is significantly longer than in the prior art cartridges described above and provides a significant advantage in that it offers an enhanced flow management system. The invention thus provides the means to deliver beverages and liquid food products, such as soups and desserts, with enhanced flavour, mouth feel, additional solids etc., due to the high surface area:volume ratio. The invention further provides a flow chamber which can incorporate surface coatings, such as milk or chocolate powder, resulting in enhanced beverage/food organoleptic properties.

The invention is also advantageous in that the improved cartridge enables the incorporation of functional co-ingredients (e.g. caramel pieces, nuts etc.) in the beverage using a single cartridge.

The invention also solves the problem, of handling soluble ingredients such as milk powder and extra thick liquid ingredients, such as condensed milk and custard, used not only in making beverages, but also in other food products, such as soups and desserts, as well as ingredients that require extracting, such as tea or coffee.

The internal diameter of the chamber preferably lies in the range of 1 to 20 mm, more preferably in the range of 1 to 10 mm and more preferably still in the range of 5 to 8 mm.

The internal length of the chamber preferably lies in the range of 50 to 1000 mm.

The chamber may comprise a plurality of interconnecting compartments each containing at least one ingredient.

Preferably there are at least 6 interconnecting compartments.

At least one ingredient is preferably provided in an at least partially soluble coating on at least a part of an inner surface of the chamber.

More preferably, different ingredients are provided in different at least partially soluble coatings formed one over the other.

At least partially soluble coatings containing different ingredients may be provided sequentially along at least a part of the length of the chamber and preferably some or all of the ingredients are at least partially soluble.

Thus the cartridge design enables the provision of sequential release of multiple ingredients, such as functional co-ingredients released at the bottom first, then from a first coating in the chamber, and finally from a second coating thus enabling layered beverages to be produced from a single cartridge.

One or more of the ingredients may be at least partially insoluble.

Preferably flow control means are provided in the chamber to modify the flow of liquid therethrough.

The flow control means may divert the flow path of the liquid or they may increase the turbulence in the flow path. Alternatively they may restrict the internal diameter of the chamber to change the flow velocity of the liquid.

BRIEF DESCRIPTION OF THE DRAWINGS

Embodiments of the present invention will now be described, by way of example only, with reference to the accompanying drawings, in which:

FIGS. 7a and 6a are cross section side elevation of the casing formed from the upper and lower sections shown in FIGS. 7 and 8 at different orientations;

DETAILED DESCRIPTION

Figure 1:
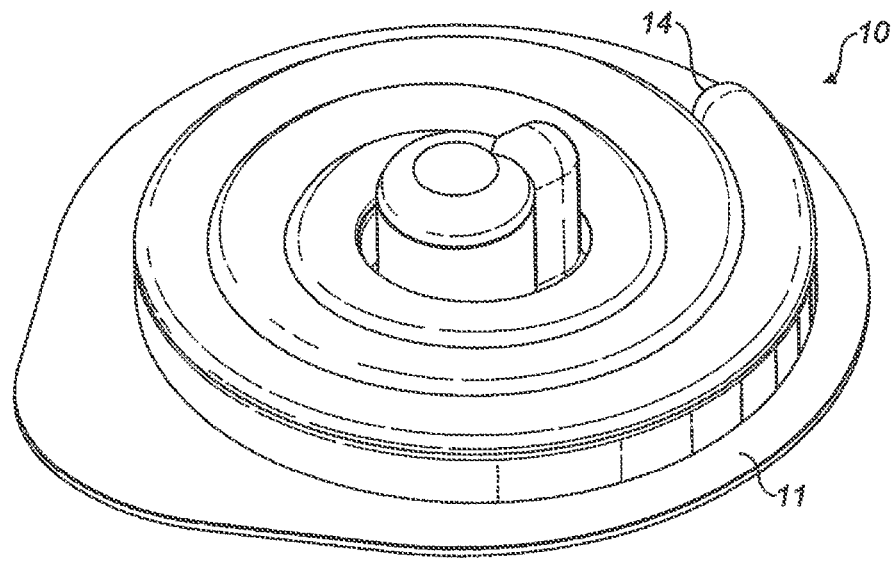
FIG. 1 is an isometric view of a cartridge of the present invention.
Figure 2:
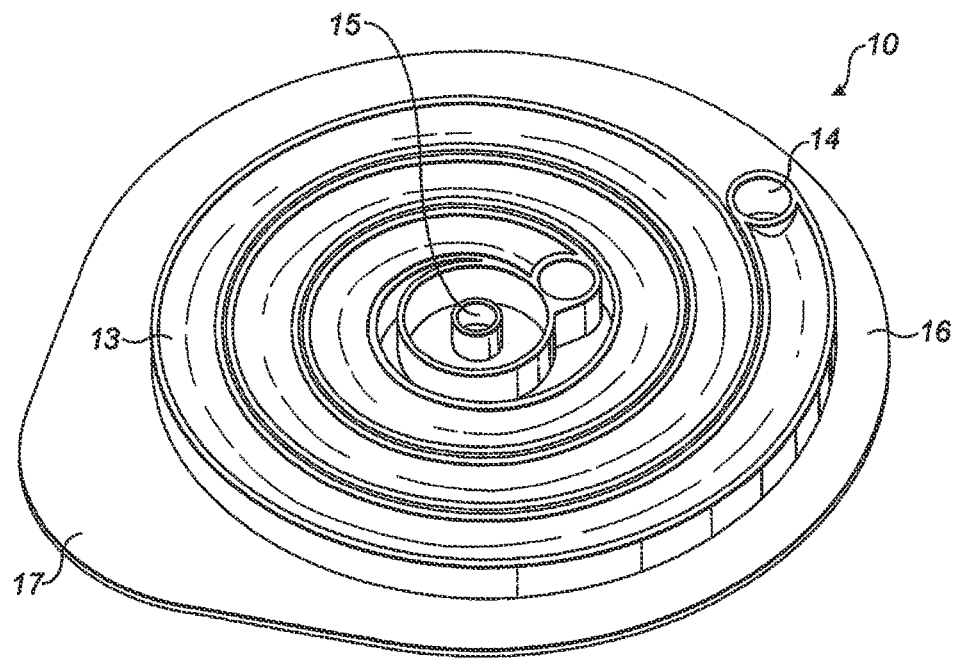
FIG. 2 is a similar view to that of FIG. 1, with a section of the outer casing of the cartridge removed.

A first embodiment of the cartridge of the present invention is illustrated in FIGS. 1 and 2. These show a cartridge 10 suitable for use in an automated brewing machine. The cartridge 10 generally comprises a casing 11 and sealing means. The casing 11 and sealing means are assembled to form the cartridge 10. The casing 11 at least partly defines an elongate tubular chamber 13 containing one or more beverage or food ingredients. The chamber 13 has a width to length ratio lying in the range of 1:4 to 1:200. The tubular chamber 13 does not need to be cylindrical in cross section as shown, but may have any desired cross sectional shape.

The chamber 13 has an inlet 14, an outlet 15 and provides a continuous elongate fluid flow path linking the inlet 14 to the outlet 15. The inlet 14 and outlet 15 are initially sealed by the sealing means and are opened, in use, by piercing, cutting or removing the sealing means. Other components may optionally be included in the cartridge 10, such as a filter, as will be described further below.

The chamber 13 contains one or more ingredients suitable for the formation of a beverage or liquid food product. The formation process may involve dissolution of the one or more ingredients by the liquid, admixing of the ingredient and the liquid, dilution, steeping, brewing or a combination of any of these processes when the liquid is introduced into the chamber 13. Beverage products may be, for example, coffee, tea, chocolate or dairy and/or non-dairy based coffee creamers and milk. Food products may be, for example, soups, custards, sauces and the like. The ingredients may be powdered, ground, leaf-based or liquid, The ingredients may be partially or wholly insoluble or partially or wholly soluble. Examples of ingredients include roast and ground coffee, leaf tea, powdered soup, liquid milk-based beverages, milk powder, chocolate powder, cordials and concentrated fruit juices, flavoured coffee-mix powders, melted white, dark or milk chocolate, melted chocolate with nut pieces embedded, crunchy or chewy particles, thick/viscous custard-like liquids, other sticky/thick/viscous dessert mixtures etc.

The overall shape of the cartridge 10 illustrated is generally circular or disc-shaped with the diameter of the cartridge 10 being significantly greater than its height. This dimension is limited by the machine in which the cartridge 10 is intended to be used. Typically the overall diameter of the cartridge 10 is 74.5 mm±6 mm and the overall height is 16 mm±3 mm.

The cartridge 10 is provided with an outwardly extending flange 16. Typically the flange 16 has a width of between 2 and 4 mm. A portion of the flange 16 is enlarged to form a handle 17 by which the cartridge 10 may be held. The flange 16 and handle 17 are generally used to locate the cartridge correctly in the brewing machine.

A filter (not shown) may be disposed in the flow path to remove non-soluble items from the product stream. The filter is preferably made from a material with a high wet strength, for example a non-woven fibre material of polyester. Other materials which may be used include a water-impermeable cellulosic material, such as a cellulosic material comprising woven paper fibres. The woven paper fibres may be admixed with fibres of polypropylene, polyvinyl chloride and/or polyethylene. The incorporation of these plastic materials into the cellulosic material renders the cellulosic material heat-sealable.

The casing 11 is preferably formed as two separate mouldings from high density polyethylene, polypropylene, polystyrene, polyester, or a laminate of two or more of these materials. A suitable polypropylene is the range of polymers available from DSM UK Limited (Redditch, United Kingdom). The casing 11 is preferably made using injection moulding and the sections of the casing are joined in a suitable manner, for example by ultrasonic or heat welding.

Alternatively, the casing 11 may be made from a biodegradable polymer. Examples of suitable materials include degradable polyethylene (for example, SPITEK supplied by Symphony Environmental, Borehamwood, United Kingdom), biodegradable polyester amide for example, BAK 1095 supplied by Symphony Environmental), poly lactic acids (PLA supplied by Cargil, Minn., USA), starch-based polymers, cellulose derivatives and polypeptides.

In use, when the inlet 14 and outlet 15 have been opened by the action of the machine piercing the sealing means, the liquid, under pressure, enters the cartridge 10 and flows into the chamber 13 through the inlet 14. The liquid flows through the chamber 13 in contact with the ingredients contained therein. The beverage or food product formed by passage of the water through the chamber 13 passes to the outlet 15 where the product is directed by the machine for discharge into a receptacle such as a cup or bowl.

The tubular chamber 13 of the cartridge 10 of the present invention has a greatly extended internal width to length ratio when compared to those in prior art cartridges and this provides a number of significant advantages in the ability to manage the liquid used to prepare the beverage or food product and thereby modify the characteristics of the prepared product. One way of achieving this is by forming the chamber 13 as a spiral tube which starts at the inlet 14 and spirals inwardly to the outlet 15 (as shown in FIGS. 1 and 2). This is particularly suitable for the disc-type cartridge 10 illustrated in FIGS. 1 and 2.

The preferred internal diameter of the chamber 13 lies in the range of 1 to 20 mm, more preferably 1 to 10 mm and most preferably 5 to 8 mm. The preferred internal length of the chamber 13 lies in the range of 50 to 1000 mm.

One of the advantages of using an elongate chamber 13 is that the preparation time, i.e. the amount of time taken for the liquid (water or another fluid) to pass through the chamber 13 is significantly extended. Furthermore there is a very high surface area:volume ratio which can be used in a number of beneficial ways. For example it enables powders and thick liquids to be flushed out, thus allowing more solids to be incorporated in the beverage or food product. This reduces the residue left in the chamber 13.

Figure 3:
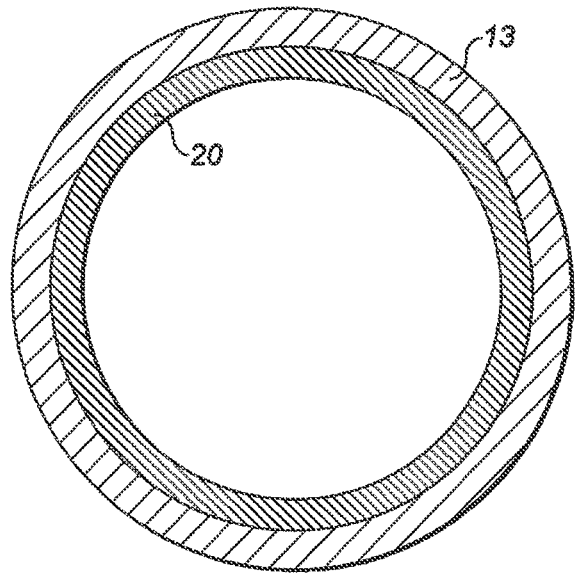
FIG. 3 is a cross sectional front elevation of one embodiment of the cartridge of the present invention.

As shown in FIG. 3, one or more soluble ingredients may be provided in a soluble coating 20 on at least a part of the inner surface of the chamber 13. Suitable compositions for the coating 20 would be spray dried coffee, freeze dried coffee, milk powder, creamer powder, coffee mix powder or a matrix holding a flavouring ingredient. As the liquid flows through chamber 13, the coating 20 dissolves, providing a continuous controlled release of the ingredients along the length of the chamber 13.

The coating 20 may be around the full inner circumference of the brew chamber 13, as shown in FIG. 3, or just a part. The coating may extend along the whole length of the chamber 13, or just a section thereof, preferably a section close or adjacent to the inlet 14. Coatings containing different ingredients may be provided sequentially along at least a part of the length of the chamber 13.

The total surface area of the coating 20 and its thickness are selected according to the desired rate of dissolution, which will depend on the nature and composition of the beverage ingredient(s). The coating 20 may be applied using desiccation, thermal cycling, electrostatic, co-adhesients (food grade glues), melting and cooling or using structured surfaces/tracks to keep the coating in place (lock & key system). There are a number of other methods which can also be used and the invention is not restricted to any particular one.

Figure 4:
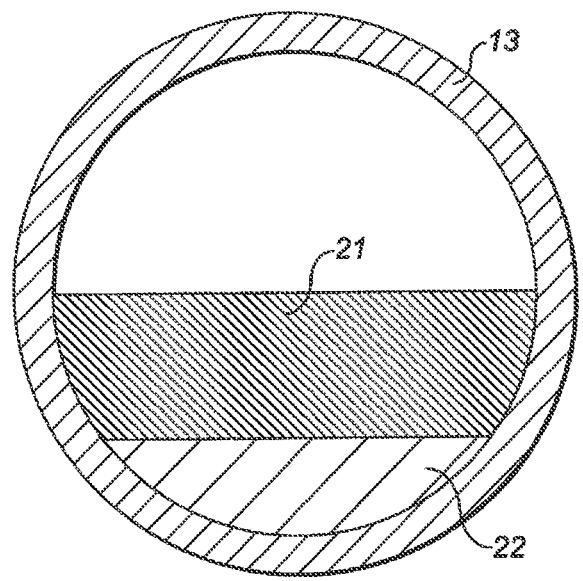
FIG. 4 is a cross sectional front elevation of another embodiment of the cartridge of the present invention.

In another embodiment of the invention, as shown in FIG. 4, the chamber 13 is partially coated with soluble layers 21,22 of two for more) soluble ingredients. The arrangement is such that the liquid initially contacts and dissolves the first layer 21, which initially covers the second layer 22. As the first layer 21 dissolves, the second layer 22 becomes exposed to the liquid flow and starts dissolving, thereby providing a temporal and sequential dimension to the brew kinetics. This arrangement may be used to provide layered beverages, or the release of foams or co-ingredients that provide additional quality benefits, such as chocolate fragments, nuts or caramel pieces using a single cartridge 10 with a single chamber 13.

Figure 5:
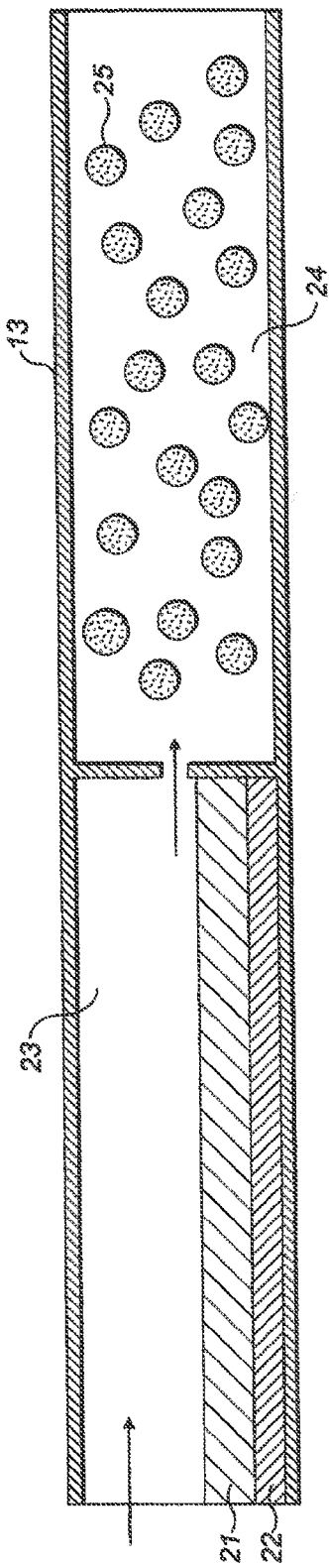
FIGS. 5 and 6 are side cross sectional elevations of other embodiments of the cartridge of the present invention.

FIG. 5 illustrates a straight cylindrical tubular chamber 13, which has a first compartment 23 which has different beverage ingredients in soluble layers 21, 22. The chamber 13 has a second compartment 24, which is fluidly linked to the first compartment 23, in which are located co-ingredients 25 which are mixed into the product stream flowing out of the first compartment 23 before the product is dispensed. The advantage of storing these co-ingredients in a separate compartment 24 of the chamber 13 is that clean delivery of these co-ingredients is more likely.

Figure 6:
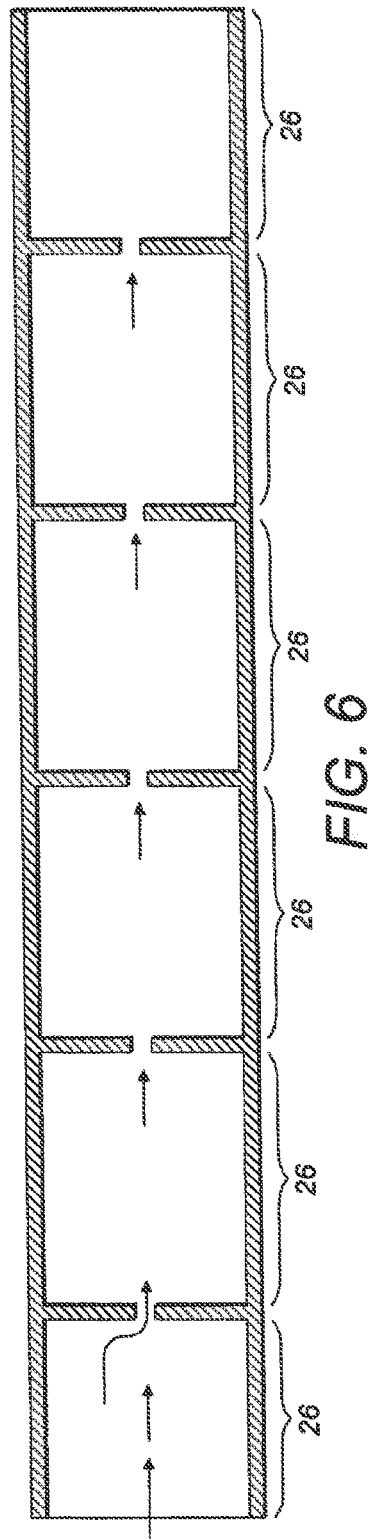

As illustrated in FIG. 6, the chamber 13 may also be divided into multiple compaction beds, in the form of a plurality of joined capsules 26 linked to provide a continuous fluid flow path therethrough. Each capsule 26 contains a small amount of one or more ingredients, either as a soluble coating or in a compaction bed, and any number of capsules 26, from 2 to 100, may be used.

Figure 7:
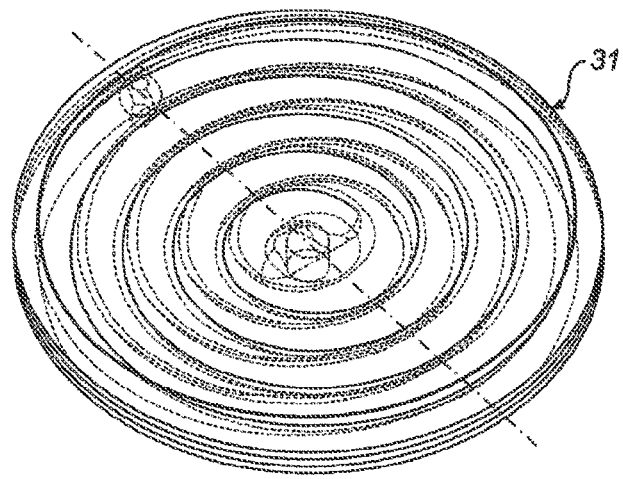
FIGS. 7 and 8 are isometric views of upper and lower sections of the casing of another embodiment of the cartridge of the present invention.
Figure 7A:
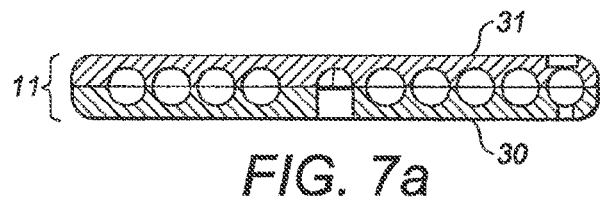
Figure 8:
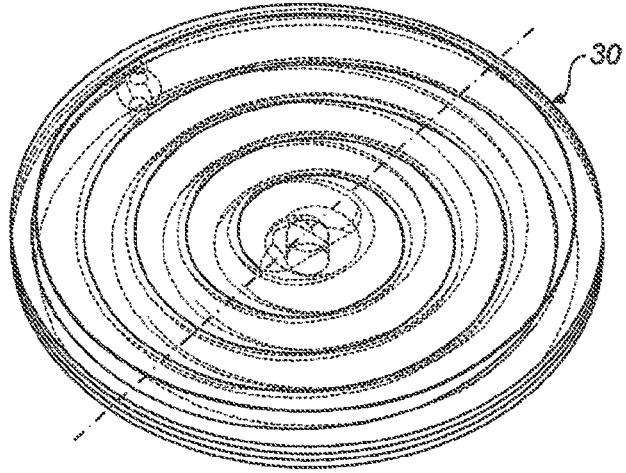
Figure 8A:
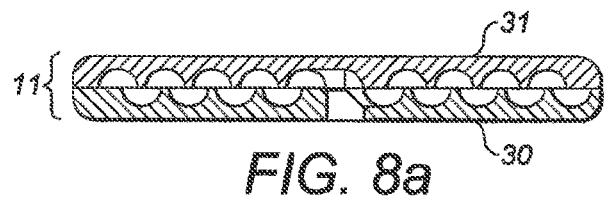

In another embodiment of the cartridge shown in FIGS. 7 and 2, the casing 11 has top and bottom sections 30,31 each of which has a section of the chamber 13 in the form of a spiral, but with the spirals in opposing directions. In FIGS. 7 and 7*a* the spirals line up, whereas in FIGS. 8 and 8*a* the spirals are offset by half the pitch. The water is fed in at the inlet and feeds around the opposing spiral track. The flow is split between the upper and lower spiral and travels in opposing directions. This creates turbulence, resulting in stirring/mixing of the product.

Figure 9:
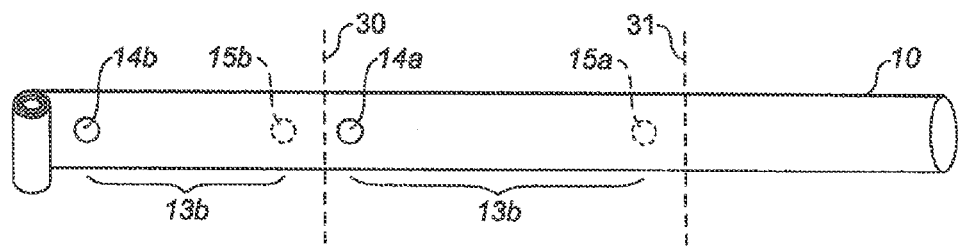
FIGS. 9 and 10 are side elevations of further embodiments of the cartridge of the present invention.

Other configurations for the cartridge 10 can also be used, such as straight, possibly flexible, elongate tubes or pipe-like structures (see FIGS. 5 and 6) where the spade in the brewing machine is not as limited as those which use the above-described cartridges 10. Such structures may be used, for example, in vending machines and commercial/office machine deliveries. A suitable construction for this type of use is shown in FIG. 9 in which the cartridge 10 is an elongate flexible tube which contains one or more ingredients, say in the form of a dry powder. The tube may initially be rolled up for convenience of handling. A chamber 13 is defined by a pair of spaced apart compression points 30,31 applied by suitable devices and includes an inlet 14 at one end and an outlet 15 at an opposite end. A first end section of the tube is positioned for use in the machine with a first chamber 13*a* defined by the compression points. When the beverage or food product is requested, the sealing means 12 (not shown) covering the inlet 14*a* and outlet 15*a* is pierced by a suitable device to allow the liquid to be injected into the outlet 14*a* and pass along the chamber 13*a* and out of the outlet 15*a*. After the product has been dispensed, the used section is cut off and a new section unrolled, with a second chamber 13*b* having inlet 14*b* and outlet 15*b* lined up ready to use.

Figure 10:
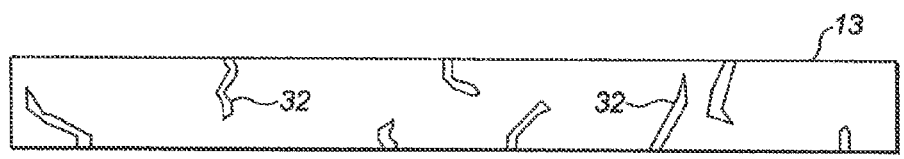

As a further alternative, the chamber 13 may be provided with internal projections 32 or the like (as shown in FIG. 10) to provide different flow properties. The projections may restrict the internal diameter of the chamber 13 to change the flow velocity, or divert the liquid flow or add turbulence to the flow.

The following examples describe laboratory testing of the present invention to demonstrate how the elongate liquid flow path in the cartridge of the present invention provides an enhanced liquid management system over a prior art cartridge. The Examples illustrate how beverages and liquid food products with enhanced characteristics can be produced due to high surface area:volume ratio.

Example 1

Figure 11:
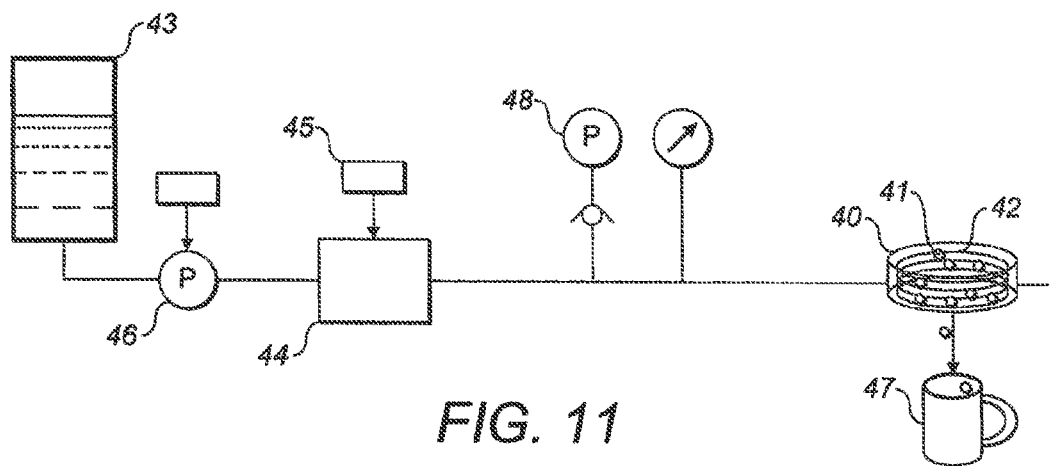
FIG. 11 is a schematic showing a test set up for testing a cartridge of the present invention.

Approximately 20 Ca-Alginate coated rice crispy pieces 41 having a diameter of approximately 3 mm were placed in an acrylic model cartridge 40 having a spiral tubular chamber 42 similar to that shown in FIG. 7. The remainder of the tubular chamber 42 was filled with 4 times concentrated Ultrafiltrated milk. Hot water was fed from a water tank 43 through a water heater 44 with a hot tank control module 45 to be heated to a temperature of 90° C. The heated water was run through the model cartridge 40 using a 65V Invensys vibrating piston pump 46 driven at 50 Hz and full speed (100%) at a cycle time of 45 seconds. This is illustrated in FIG. 11. On running the heated water through the spiral chamber 42, all of the Ca-Alginate coated rice crispy pieces 41 were dispensed into a cup 47 placed beneath the model cartridge 40. The remaining liquid (water) was further dispensed by an air purge via a Bühler 12 v pump 48.

Example 2

Approximately 20 clear Ca-Alginate beads with a diameter of approximately 5 mm were placed in the same acrylic model cartridge 40 described in Example 1. The remainder of the tubular chamber 42 was filled with caramel flavoured syrup. Hot water was run through the model cartridge 40 as described in Example 1. All of the 20 pieces of Ca-Alginate beads, together with diluted caramel flavoured syrup were successfully dispensed into the cup at the bottom of the model cartridge.

Example 3

Approximately 3 g of skim milk, powder was placed in the bottom part of the acrylic model cartridge 40 described in Example 1. This quantity was sufficient to fully load the bottom section of the chamber 42. Hot water was passed through the model cartridge 40 as described in Example 1. All of skim milk powder was fully dissolved and dispensed into the cup 47.

Example 4

Approximately 3 g of very thick chocolate syrup (made with 20 g of dark chocolate, 4 g of: granulated sugar, 40 g of water and stirred for 30 minutes at 60° C.) was fully loaded in the bottom part of the acrylic model cartridge 40 described in Example 1. Hot water at 90° C. was passed through the model cartridge 40 as described in Example 1. All of the chocolate syrup was dispensed into the cup 47.

Comparative Example 1

Figure 12:
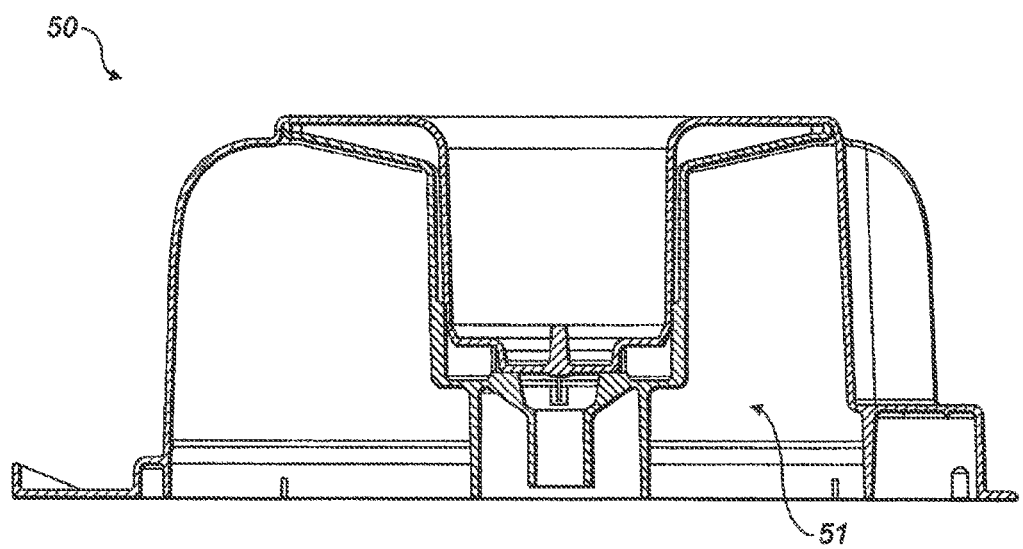
FIG. 12 is a cross sectional side elevation of a prior art cartridge.

Approximately 20 clear Ca-Alginate beads with a diameter of approximately 1 mm were placed in the brew chamber 51 of a prior art cartridge 50 as shown in FIG. 12. The remainder of the chamber 51 was filled with 4 times concentrated Ultrafiltrated milk. On preparation in a standard Tassimo™ brewing machine, similar to that described in EP-A-1440644, diluted milk was dispensed by the machine. However, none of the 20 clear Ca-Alginate beads were dispensed Comparative Example 2

Approximately 9 g of agglomerated skim milk powder was loaded into the prior art cartridge 50 and processed in a brewing machine as described in Comparative Example 1. A cloudy liquid with very little milk solids was dispensed by the machine. On opening the cartridge 50, approximately 9 g of residue (powder and water) was observed in the chamber 51. The remaining milk powder was in the form of wet paste made up of powder particles clumped together with the addition of water.

Comparative Example 3

Approximately 20 g of the thick chocolate liquid described in Example 4 was loaded into the prior art cartridge 50 and processed in a brewing machine as described in Comparative Example 1. Cloudy/dirty hot water was dispensed by the machine. On opening the cartridge 50, around 12 g of residue (chocolate syrup and water) was observed in the chamber 51.

The invention claimed is:

1. A cartridge for use in a machine for preparing a beverage or food product from at least one ingredient and a liquid, said cartridge comprising a continuous elongate tubular chamber containing the at least one ingredient and providing a fluid flow path linking an inlet for the introduction of the liquid at one end of the chamber to an outlet for discharge of the beverage or food product at an opposite end of the chamber, the continuous elongate tubular chamber extending about one of the outlet and the inlet, the chamber having a length between the inlet and the outlet and the fluid flow path extends along the length of the chamber, wherein the chamber has an internal width to length ratio in the range of 1:4 to 1:200.

2. A cartridge as claimed in claim 1 wherein the chamber has an internal diameter in the range of 1 to 20 mm.

3. A cartridge as claimed in claim 1 in which the internal length of the chamber lies in the range of 50 to 1000 mm.

4. A cartridge as claimed in claim 1 in which the chamber comprises a plurality of interconnecting compartments each containing at least one ingredient.

5. A cartridge as claimed in claim 4 in which there are at least 6 interconnecting compartments.

6. A cartridge as claimed in claim 1 in which at least one ingredient is provided in an at least partially soluble coating on at least a part of an inner surface of the chamber.

7. A cartridge as claimed in claim 6 in which different ingredients are provided in different at least partially soluble coatings formed one over the other.

8. A cartridge as claimed in claim 6 in which at least partially soluble coatings containing different ingredients are provided sequentially along at least a part of the length of the chamber.

9. A cartridge as claimed in claim 1 in which some or all of the ingredients are at least partially soluble.

10. A cartridge as claimed in claim 1 in which one or more of the ingredients are at least partially insoluble.

11. A cartridge as claimed in claim 1 in which flow control means are provided in the chamber to modify the flow of liquid therethrough.

12. A cartridge as claimed in claim 11 in which the flow control means divert the flow path of the liquid.

13. A cartridge as claimed in claim 11 in which the flow control means increase the turbulence in the flow path.

14. A cartridge as claimed in claim 11 in which the flow control means restrict the internal diameter of the chamber to change the flow velocity of the liquid.

15. A cartridge as claimed in claim 1 wherein the chamber has an internal diameter in the range of 1 to 10 mm.

16. A cartridge as claimed in claim 1 wherein the chamber has an internal diameter in the range of 5 to 8 mm.

* * * * *